(12) United States Patent
Södergren

(10) Patent No.: US 6,326,070 B1
(45) Date of Patent: Dec. 4, 2001

(54) ABSORPTION MEANS

(75) Inventor: Bo Södergren, Åtvidaberg (SE)

(73) Assignee: Virkensdamm AB (SE)

( * ) Notice: Subject to any disclaimer, the term of this patent is extended or adjusted under 35 U.S.C. 154(b) by 0 days.

(21) Appl. No.: 09/254,283

(22) PCT Filed: Sep. 4, 1997

(86) PCT No.: PCT/SE97/01478

§ 371 Date: Mar. 3, 1999

§ 102(e) Date: Mar. 3, 1999

(87) PCT Pub. No.: WO98/10146

PCT Pub. Date: Mar. 12, 1998

(30) Foreign Application Priority Data

Sep. 5, 1996 (SE) ................................................ 9603221

(51) Int. Cl.⁷ .............................. B29D 22/00; B32B 5/16; B01D 24/00; B01D 39/00; A47K 7/02
(52) U.S. Cl. ........................ 428/36.1; 428/407; 428/327; 210/504; 210/505; 210/502.1; 210/691; 210/924; 15/244.4
(58) Field of Search ..................................... 428/472, 421, 428/424.4, 425.1, 35.6, 35.2, 35.5, 36.1, 503, 507, 511, 407, 327, 537.1; 210/500.29, 922, 925, 504, 505, 502.1, 691, 924; 134/6, 7; 15/244.4

(56) References Cited

U.S. PATENT DOCUMENTS

| | | | |
|---|---|---|---|
| 2,480,753 | * 8/1949 | McCarter | 252/89 |
| 3,609,434 | * 9/1971 | Berry | 313/93 |
| 3,617,565 | * 11/1971 | Fahlvik | 210/40 |
| 4,343,680 | 8/1982 | Field et al. | 162/100 |
| 4,401,475 | * 8/1983 | Eriksson et al. | 134/6 |
| 4,519,918 | * 5/1985 | Ericsson et al. | 210/680 |
| 4,925,343 | * 5/1990 | Raible et al. | 405/60 |
| 5,110,785 | 5/1992 | Reed et al. | 502/404 |
| 5,248,391 | 9/1993 | Lunenschloss | 162/218 |
| 5,453,191 | * 9/1995 | McCrory et al. | 210/242.2 |
| 6,048,461 | * 4/2000 | Sogell | 210/651 |

FOREIGN PATENT DOCUMENTS

| | | |
|---|---|---|
| 414382 | 2/1991 | (EP) . |
| 175804 | 5/1994 | (NO) . |
| 9200804 | 1/1992 | (WO) . |

* cited by examiner

Primary Examiner—Rena L. Dye
Assistant Examiner—Michael C. Miggins
(74) Attorney, Agent, or Firm—Hayes, Soloway, Hennessey, Grossman & Hage, P.C.

(57) ABSTRACT

Sawdust particles are freed from their terpene content and thereafter coated with a Teflon wax. The Teflon coated sawdust is hydrophobic and consequently does not absorb water, while the ability to absorb oil is improved. The Teflon coated sawdust is useful in control of oil spills.

6 Claims, No Drawings

ABSORPTION MEANS

BACKGROUND OF THE INVENTION

In order to degrade or collect liquids and contaminants numerous different types of absorption means are known. Despite this, no satisfactory solution exists today for the handling of liquid discharges, for instance oil discharges. Not only large undesirable and unintentional discharges must be minimized, but it is also necessary to reduce the damage that smaller discharges may cause since their number are considerable. While a single workshop that discharges a little oil into the municipal waste system may not be a great catastrophe, if several small discharges take place at several locations and repeatedly, the pollution load will in the long run become unacceptable. In view of this the invention has as its object to provide an absorption means that is practically useful and efficient and a method for the fabrication of this, and a method to use the absorption means.

SUMMARY OF THE INVENTION

The absorption means according to the invention has as its major component saw dust that in one way or another has had the terpene content removed. Depending upon the intended use for the absorption means the saw dust will be treated differently. If water or water carried substances are to be absorbed, the sawdust is softened. This can be done in different ways, for instance by spraying the sawdust with rain water or by the use of a softening agent of a similar type as is used for the washing of textiles. In this way the treated sawdust can quickly and efficiently absorb floating pollutants where water is an essential component. Also oil and petrol can be absorbed. The absorption capacity is sufficient to almost completely dry out an underlayer. The absorption means of the present invention has a stronger suction effect on water than underlayers such as concrete, asphalt, stone etc.

Alternatively, the terpene-free sawdust may be treated with a Teflon wax so as to coat the dust particles. The sawdust treated in this way becomes hydrophobic and consequently is different from the above described absorption means in that it does not absorb water. At the same time, the ability to absorb oil seems to be considerably improved. This absorption means is therefore well suited for use with oil discharges. The oil is not repelled by the Teflon and thus can pass into the respective sawdust particles and is there sucked into the spaces that originally were filled with terpenes. Since the absorption means is selective, it can be used specifically for the control of oil or petrol and the like without absorbing the surrounding water, that otherwise may be entirely clean. Since no water bonds to the sawdust after the absorbing of the oil, the absorption means will float on the water. In this way, the absorption means is easy to collect, particularly in comparison with many of the other absorption means that exist on the market, which sink to the bottom and thus pollute, which while not visible are more difficult to cure than pollution on the surface.

DETAILED DESCRIPTION OF THE INVENTION

The starting material used in accordance with the invention may be treated in different ways in order to become terpene free and essentially free from water. Sawdust may be composted or simply put in large heaps or piles that may decompose or "burn" so that the terpene content is reduced. When this has taken place, which takes a comparatively long time, the sawdust can be dried, and then used as a starting material for the fabrication of the absorption means according to the invention. The material made in this way will essentially be black.

Sawdust used in accordance with the invention also may be force dried quickly at a high temperature to drive out the terpenes from the dust. This may seem to be a more expensive fabrication method, but since the sawdust in any case must be dried and burnt sawdust has turned out to be comparatively difficult to dry, this is an economical alternative.

In particular advantageous further development of the invention, one may instead of drying sawdust, use fuel pellets or the waste resulting from the fabrication of fuel pellets from sawdust. The fuel pellets or waste material from its fabrication is then ground or disintegrated in a mechanical way to the required fine grain.

Fuel pellets are made by heating the sawdust which drives out the terpenes from the material and evaporates them as well as the water content, whereafter the material is pressed together into pellets. Grinding the pellets in accordance with the invention results in absorption means that are particularly efficient. An explanation of this might be that when the material is freed from terpenes and water is compressed under high pressure, practically all the separate cell structures collapse and the lignin in the still hot material then functions as a glue holding the material together in the compressed form when the material is then allowed to cool off. Then, when the material again is ground or worked in some other mechanical way the glue lines are broken up and the cell structure can expand again. If the material also is subjected to a subsequent heating, as for instance, during drying after adding the Teflon, the binding ability of the lignin is reduced and the material can expand to an even more porous structure. The fact that fuel pellets so compressed do not float is the reason they are not used as starting material for a material that is meant to float. However, after grinding and in particular after Teflon treatment the pellets float.

Since the Teflon is added before the final heat achieved expansion of the particles, the Teflon will be situated on the surfaces of the particles, and particle edges etc., that is the points that come in contact with for instance the water surface and this provides hydrophobic properties. On the other hand little or no Teflon will end up centrally within the particles and thus coverage by the Teflon is good and at the same time a minimum amount of Teflon is used.

The absorption means according to the invention can be used in a number of different ways, for instance, spread on a floor for absorbing petrol, oil etc. from water on the floor. The absorption means with absorbed liquids can then be disposed of by being burned in a refuse incinerator together with ordinary garbage. The sawdust in itself is considered as fully environmental friendly and in general the liquids that have to be absorbed are entirely harmless if they are burnt. Most municipal incineration installations are also provided with equipment for cleaning of fumes, and thus it does not matter if a small amount of metals, for instance heavy metals, should be in the oil that is absorbed.

In the case of discharge of petrol or oil on water, for instance in connection with the filling of boats, the Teflon wax coated variety of the absorption means in accordance with the invention may quickly be spread over the surface of the water and then to be collected with a net after a while. Even here generally the oil or petrol that is spilled is in itself not dangerous to the environment provided that it is burnt, and one can thus dispose of the sawdust with the accompanying oil by burning. For this, of course, the combination heat in the sawdust as well as the oil or petrol is used.

As has been described above the absorption means according to the invention can be used in pulverized form and be scattered over the area that is to be treated. As an alternative to this however the material may be sewn into a suitable textile, for instance polypropylene fabric and formed into battans, sheeting, pads or hoses. In particular, the hoses or battans can be joined together to form barriers for the use on water, these barriers being filled with the Teflon coated variety of the invented means. The barriers are preferably provided with snap hooks at their ends so that they can hook into corresponding loops arranged on the sides of the barriers, this so that an overlap may be obtained for separate barrier sections. Barriers made in this way not only can be used to confine an oil discharge as such but may also confine or contain the discharge when the oil has been absorbed by the spread absorption means. By moving the barriers, the spread absorption means with absorbed and/or contained pollution may be concentrated or moved in order to facilitate the collection and subsequent destruction. Since the absorption means floats the barriers also float.

The above mentioned sheetings and pads respectively may for instance be used for damage and leakage of fuel or hydraulic systems of working machines, tractors, lorries, etc. in a simple manner to take care of the spilled oil. Since the means is enclosed it is easy to transport. The sheetings may with advantage be constituted by two pieces of fabric of for instance polypropylene that have been sewn together so that longitudinal channels are formed extending the entire length of the sheeting. In one end the channels may then be closable by means of sewn fast hook and loop tapes. This makes filling and closing of the channels particularly simple. Furthermore the option to open a channel when needed to remove some absorption means is possible, for instance if the ground on which the leakage has occurred is too uneven to allow absorbing directly with the sheeting as such.

Since the sawdust that constitutes the main constituent in the invention is free from terpenes, it is also less volatile than dry sawdust. The low ignition temperature for wood is mainly governed by the presence of the terpene. Without this, the ignition temperature of the sawdust increases considerably and it need thus not be considered as flammable. When the sawdust has been used and has absorbed oil or other combustible hydrocarbons, the ignition temperature is governed by the ignition temperature of the absorbed oil or hydrocarbon, and the absorption means is no longer difficult to ignite and burn.

The Teflon coated variety of the absorption means according to the invention contains such small quantities of Teflon that no risk exists and when the absorption means and oil or some other pollution are burnt in a large refuse incinerator, any gas emitted by the Teflon is easily handled.

While the absorption means according to the invention is universal and one has to choose if one or the other variety is to be used, in most cases it is no problem to know in advance which type of absorption means that is needed to be at hand. Also one has generally when developing absorption means tried to find absorption means that can handle thick oil discharges. This is not the object of the invention even if it may function just as well for thick oil as many other means, at least to reduce the tackiness on the surface.

The Teflon coated variety of the invention in particular is intended to be used for smaller discharges of thinner oil as diesel oil, petrol etc. Although it is desirable to be able to handle thick oil discharges in the sea, it is also important to control many small discharges in order to preserve the environment.

The fabrication of the means in accordance with the invention may in a simple manner be carried out in a mixing drum, resembling those that are used for cement and concrete mixing, including internal vanes that are oblique so that rotation in one direction leads to discharging, while rotation in the opposite direction retains the material in the drum at the same time as mixing takes place. When the raw material for the invention, preferably atomized residues from the fabrication of fuel pellets, are placed in the drum, the drum is rotated and the atomized residues are tumbled in the drum. During this continuous tumbling, atomized jets or a mist of Teflon that has been dissolved or emulsified in alcohol, for instance isopropanol is sprayed into the drum, preferably the Teflon wax may be "Hansa Prob 6804-S" distributed by Firma Cantarsia.

The reason for the exceptional suction ability and the absorbing capacity resulting from the use of a wax such as Teflon wax is not understood. However, without wishing to be bound by theory, it is believed that the Teflon reduces the surface tension for the oil that is to be sucked up. Thus, the use of a seemingly unsuitable hydrophobic agent is unexpectedly effective. The Teflon solution is, for instance, 7% Teflon and the remaining part alcohol and is added in an amount corresponding to about 10% of the weight of the absorption means.

After the above given amount of Teflon in solution has been added the drum is run for a while to distribute the Teflon over the surface of the chips while the solvent evaporates during continued stirring and airing of the material. If desired, drying may of course be hastened by adding heat, for instance in the form of hot air or infra-red heat. When the alcohol has been driven off, the rotational direction is changed and the oblique vanes of the drum feed out the coated absorption means, which by means of a band conveyor, screw conveyor or blowing can be transported to suitable filling stations for sacks, pads, barriers or bars.

The above fabrication method is of course also useful for the fabrication of the water absorbing absorption means variety. Here however the Teflon dissolved in alcohol is substituted by the injection of a suitable softening agent. As softening agent is here understood as agents that reduce the degree of hydrophobic property that is obtained at the preceding forced drying of the starting material. With this embodiment it furthermore is not necessary to dry the material after the mixing with the softening agent, since softening occurs only with water or in a water dissolved softening agent, such as "Pluronic (P6800)" from Basis Kemi AS. Thus, small amounts of water that may be present have little influence on the absorbing ability.

In a more industrial scale the absorption means according to the invention may be made in an installation including a hopper for pellets, that in its lower end is provided with outlet feed means, for instance feed screws, that transport the material to a hammer mill that breaks the pellets. The pellets are then transported further to a mixing chamber where Teflon wax dissolved in water is added. The Teflon wax is dissolved in the water in an amount between 5 to 10 preferably 7 volume percent. Furthermore pyro-acetic spirit (22%) may be added in an amount corresponding to 2.5–5, preferably 3.5 volume percent of the solution, which has shown itself to improve the adherence and adhesion of the Teflon to the wood material. The Teflon wax solution is added in an amount corresponding to approximately 120 liters per $m^3$ pellets.

The mixing chamber may for instance have the shape of a large diameter conveyor tube in which a feeding screw is arranged in the shape of a vane turned as a screw that is fastened to a central drive shaft by means of spokes that will expedite an efficient mixing at the same time as the material is slowly fed forward by the vane that moves close inside of the inner wall of the chamber. In the wall of the mixing chamber, in particular on the upper side, a number of inlet jets are arranged distributed over the length of the chamber for the adding of the Teflon wax solution.

From the mixing chamber the material is fed further onto a drying chamber with similar construction as the mixing chamber but with the difference that instead of jets an electric heater is arranged for the drying of the material, as well as an outlet for vaporized water. The drying temperature is preferably kept between 150 and 250° C. and can be controlled by the feeding speed or by the amount of water that one wishes to vaporize. The dried material is then transported by a screw to a filling station.

Alternatively, the material in the mixing chamber may be admixed with a softening agent, and then fed directly to the packing station instead of to the drying chamber.

The absorption means according to the invention may also be used as material in filters for the removal by filtering of oil and the like pollutions.

What is claimed is:

1. Absorption means comprising essentially terpene-free sawdust, coated with polytetrafluoroethylene.
2. Absorption means according to claim 1, incorporated into a pad, sheeting or battan of textile material.
3. Absorption means according to claim 2, wherein the textile material comprises polypropylene.
4. Absorption means according to claim 2, wherein the textile material further comprises a closable fastener affixed to the textile.
5. Absorption means according to claim 4, wherein said closable fastener comprises a hook and loop fastener.
6. Absorption means according to claim 1, wherein the sawdust derives from a coniferous wood.

* * * * *